(12) United States Patent
Lux et al.

(10) Patent No.: US 10,586,472 B2
(45) Date of Patent: Mar. 10, 2020

(54) THIN FILM ADHESIVE LABELS AND METHODS OF MAKING THEREOF

(71) Applicant: Acetga North America Technologies, Inc., Delran, NJ (US)

(72) Inventors: Benjamin D. Lux, Providence, RI (US); Nikolai A. Voicechovski, Westerly, RI (US)

(73) Assignee: Actega North America Technologies, Inc., Delran, NJ (US)

( * ) Notice: Subject to any disclaimer, the term of this patent is extended or adjusted under 35 U.S.C. 154(b) by 112 days.

(21) Appl. No.: 15/826,157

(22) Filed: Nov. 29, 2017

(65) Prior Publication Data
US 2018/0082610 A1 Mar. 22, 2018

Related U.S. Application Data

(62) Division of application No. 15/153,503, filed on May 12, 2016, now Pat. No. 9,911,367.
(Continued)

(51) Int. Cl.
*G09F 3/02* (2006.01)
*B32B 27/08* (2006.01)
(Continued)

(52) U.S. Cl.
CPC .................. *G09F 3/02* (2013.01); *B32B 7/12* (2013.01); *B32B 27/06* (2013.01); *B32B 27/08* (2013.01);
(Continued)

(58) Field of Classification Search
CPC ............... G09F 3/02; G09F 2003/0245; G09F 2003/0273; B31D 1/021
See application file for complete search history.

(56) References Cited

U.S. PATENT DOCUMENTS 3,276,933 A 10/1966 Brant
3,289,386 A 12/1966 Farmer
(Continued)

FOREIGN PATENT DOCUMENTS

DE 3508150 12/1985
DE 29902548 5/1999
(Continued)

OTHER PUBLICATIONS

International Search Report and Written Opinion for PCT/US2016/032191 dated Aug. 8, 2016.
(Continued)

*Primary Examiner* — Gary C Hoge
(74) *Attorney, Agent, or Firm* — Pabst Patent Group LLP (57) ABSTRACT

Thin film labels, systems, and methods of making and using thereof are described. The thin film systems contain a label and a carrier film, where the label contains an overprint layer, indicia, and an adhesive layer. The carrier film may be coated on one or both sides with a release liner. The adhesive layer can be any suitable adhesive, such as a pressure sensitive adhesive, a fluid activatable adhesive, a heat activated adhesive, or a contact activated adhesive. The label is formed by printed or coating one or more layers of precursor material on the carrier film using standard printers. Suitable precursor materials include, but are not limited to epoxys, solvent cast films, polyurethane dispersions, such as acrylic-urethane hybrid polymer dispersions and polyester-polyurethane dispersions. After the overprint layer dries or is cured, the indicia are printed onto the overprint layer, then the adhesive is coated on top of the indicia.

11 Claims, 5 Drawing Sheets

Related U.S. Application Data (60) Provisional application No. 62/160,190, filed on May 12, 2015.

(51) Int. Cl.

| | | |
|---|---|---|
| *B32B 7/12* | (2006.01) | |
| *B32B 27/06* | (2006.01) | |
| *C09J 7/29* | (2018.01) | |
| *B41F 5/06* | (2006.01) | |
| *B41F 5/24* | (2006.01) | |
| *B41F 13/12* | (2006.01) | |
| *B41F 19/00* | (2006.01) | |
| *B41F 23/04* | (2006.01) | |
| *B41J 3/407* | (2006.01) | |
| *G09F 3/10* | (2006.01) | |
| *B41M 1/00* | (2006.01) | |
| *C09D 123/06* | (2006.01) | |
| *B31D 1/02* | (2006.01) | |

(52) U.S. Cl.
CPC ............ *B41F 5/06* (2013.01); *B41F 5/24* (2013.01); *B41F 13/12* (2013.01); *B41F 19/001* (2013.01); *B41F 23/0426* (2013.01); *B41J 3/4075* (2013.01); *B41M 1/00* (2013.01); *C09D 123/06* (2013.01); *C09J 7/29* (2018.01); *G09F 3/10* (2013.01); *B31D 1/021* (2013.01); *B32B 2405/00* (2013.01); *B32B 2519/00* (2013.01); *C09J 2203/334* (2013.01); *G09F 2003/0241* (2013.01); *G09F 2003/0255* (2013.01); *G09F 2003/0257* (2013.01)

(56) References Cited

U.S. PATENT DOCUMENTS

| | | | |
|---|---|---|---|
| 3,296,018 A | 1/1967 | Sullivan | |
| 3,296,723 A | 1/1967 | Johannes | |
| 3,351,515 A | 11/1967 | Muttera, Jr. | |
| 3,531,316 A | 9/1970 | Sternasty | |
| 4,180,929 A | 1/1980 | Schultz | |
| 4,192,783 A | 3/1980 | Bomball | |
| 4,219,596 A | 8/1980 | Takemoto | |
| 4,253,899 A | 3/1981 | Takemoto | |
| 4,334,431 A | 6/1982 | Kohno | |
| 4,575,525 A | 3/1986 | Wacome | |
| 5,013,631 A | 5/1991 | Su | |
| 5,089,336 A | 2/1992 | Kumar | |
| 5,284,688 A * | 2/1994 | Hiatt | B31D 1/021 427/208.8 |
| 5,389,133 A | 2/1995 | Gundlach | |
| 5,403,025 A | 4/1995 | Shanley | |
| 5,417,790 A | 5/1995 | Petrou | |
| 5,587,405 A | 12/1996 | Tanaka | |
| 6,020,062 A | 2/2000 | Questel | |
| 6,054,006 A | 4/2000 | Pilon | |
| 6,062,062 A | 5/2000 | Toida | |
| 6,124,417 A | 9/2000 | Su | |
| 6,210,524 B1 | 4/2001 | Josephy | |
| 6,210,795 B1 | 4/2001 | Nelson | |
| 6,228,486 B1 | 5/2001 | Kittel | |
| 6,236,063 B1 | 5/2001 | Yamazaki | |
| 6,270,871 B1 | 8/2001 | Scholz | |
| 6,298,894 B1 | 10/2001 | Nagamoto | |
| 6,306,242 B1 | 10/2001 | Dronzek | |
| 6,461,707 B1 | 10/2002 | Scholz | |
| 6,517,664 B1 | 2/2003 | Dronzek, Jr. | |
| 6,562,402 B2 | 5/2003 | Scholz | |
| 6,656,319 B1 | 12/2003 | Boyd | |
| 6,663,746 B2 | 12/2003 | Dronzek | |
| 6,749,710 B2 | 6/2004 | Preston | |
| 6,773,653 B2 | 8/2004 | Miller | |
| 6,890,400 B2 | 5/2005 | Scholz | |
| 6,942,912 B1 * | 9/2005 | Blom | B44C 1/1716 428/195.1 |
| 7,026,024 B2 * | 4/2006 | Chang | B41M 5/025 428/32.12 |
| 7,122,597 B2 | 10/2006 | Calienni | |
| 7,622,171 B2 * | 11/2009 | Laprade | B32B 27/10 428/32.6 |
| 7,643,401 B2 * | 1/2010 | Takahashi | G11B 23/0021 347/224 |
| 7,892,598 B1 | 2/2011 | Dronzek | |
| 7,943,714 B2 | 5/2011 | Schnieders | |
| 8,206,884 B2 | 6/2012 | Yang | |
| 8,334,335 B2 | 12/2012 | Lux | |
| 8,334,336 B2 | 12/2012 | Lux | |
| 8,349,427 B2 * | 1/2013 | Grotefend | G09F 3/02 428/343 |
| 8,458,932 B2 * | 6/2013 | Schnuckle | G09F 19/12 40/306 |
| 8,609,212 B2 * | 12/2013 | White | G09F 3/0292 428/195.1 |
| 8,716,372 B2 | 5/2014 | Lux | |
| 8,716,389 B2 | 5/2014 | Lux | |
| 8,840,994 B2 | 9/2014 | Cho | |
| 9,254,936 B2 | 2/2016 | Cho | |
| 2002/0015828 A1 | 2/2002 | Ast | |
| 2003/0034645 A1 * | 2/2003 | Dronzek, Jr. | B31D 1/02 283/81 |
| 2003/0051382 A1 * | 3/2003 | Sinato | B65H 18/28 40/638 |
| 2003/0152722 A1 * | 8/2003 | Fearn | G09F 3/02 428/34.1 |
| 2003/0232168 A1 | 12/2003 | Fearn | |
| 2004/0038028 A1 | 2/2004 | Tanaka | |
| 2004/0221944 A1 | 11/2004 | Havard | |
| 2005/0039634 A1 | 2/2005 | Hermansky | |
| 2005/0153113 A1 * | 7/2005 | Hseih | G09F 3/02 428/201 |
| 2005/0191486 A1 | 9/2005 | Scholz | |
| 2005/0277358 A1 | 12/2005 | Isenberg | |
| 2005/0284566 A1 | 12/2005 | Wagner | |
| 2007/0062086 A1 * | 3/2007 | Hamel | G09F 7/00 40/605 |
| 2007/0119542 A1 | 5/2007 | Williams | |
| 2008/0060756 A1 | 3/2008 | Schnieders | |
| 2008/0138550 A1 | 6/2008 | Takahashi | |
| 2009/0072122 A1 | 3/2009 | Tada | |
| 2009/0136773 A1 | 5/2009 | Ghosh | |
| 2009/0169780 A1 | 7/2009 | Kimura | |
| 2009/0246377 A1 | 10/2009 | Robertson | |
| 2009/0288759 A1 | 11/2009 | Topfer | |
| 2010/0098860 A1 | 4/2010 | Robertson | |
| 2011/0033698 A1 | 2/2011 | Woods | |
| 2011/0189477 A1 | 8/2011 | Miracle | |
| 2011/0289647 A1 * | 12/2011 | Chiao | B32B 7/12 2/69 |
| 2013/0034726 A1 | 2/2013 | Lux | |
| 2014/0045976 A1 | 2/2014 | Lux | |
| 2014/0190631 A1 | 7/2014 | Cho | |
| 2014/0212615 A1 * | 7/2014 | Norgaard | B42D 5/027 428/42.1 |
| 2015/0266606 A1 | 9/2015 | Wiegers | |
| 2015/0293558 A1 * | 10/2015 | Hahn | B29C 45/1418 345/174 |
| 2015/0294602 A1 | 10/2015 | Read | |
| 2015/0367977 A1 | 12/2015 | Cho | |
| 2016/0351082 A1 | 12/2016 | Barnhardt | |
| 2016/0351083 A1 | 12/2016 | Barnhardt | |

FOREIGN PATENT DOCUMENTS

| | | |
|---|---|---|
| DE | 29902549 | 5/1999 |
| DE | 19852008 | 5/2000 |
| DE | 19905468 | 7/2000 |
| DE | 19962582 | 7/2000 |
| EP | 267619 | 5/1988 |
| EP | 312037 | 4/1989 |
| EP | 503112 | 9/1992 |

(56) References Cited

FOREIGN PATENT DOCUMENTS

| | | |
|---|---|---|
| EP | 0705896 | 4/1996 |
| GB | 841802 | 7/1960 |
| GB | 1333710 | 10/1973 |
| WO | 9734810 | 9/1997 |
| WO | 9919412 | 4/1999 |
| WO | 1999054860 | 10/1999 |
| WO | 0214448 | 2/2002 |
| WO | 0245054 | 6/2002 |
| WO | 2002055295 | 7/2002 |
| WO | 200600424 | 1/2006 |
| WO | 200777036 | 7/2007 |
| WO | 2009024357 | 2/2009 |
| WO | 2010042104 | 4/2010 |
| WO | 2010042105 | 4/2010 |
| WO | 2010076807 | 12/2010 |
| WO | 2011150000 | 12/2011 |
| WO | 2012109140 | 8/2012 |
| WO | 2012109148 | 8/2012 |
| WO | 2014109983 | 7/2014 |

OTHER PUBLICATIONS

Breard, "Hanging on through thick and thin: A look at static-cling vinyls", Screenprinting Magazine, pp. 1-9, Mar. (2005).
Dow Chemical Co., "Dowanol TPM Glycol Ether [Tripropylene Glycol Methyl Ether]" pp. 1-5, Revised Nov. 22, 2015, retrieved from The Dow Chemical Company May 16, 2016.
Dow Chemical Co., "Downaol PM". Technical Data Sheet, pp. 1-2, Retrieved from the Dow Chemical Company, May 16, 2016.
Smith, "Review of glycol ether and glycol ether ester solvents used in the coating industry", Environl Health Perspect., 57:1-4 (1984).
International Search Report and Written Opinion for PCT/US2012/023964 dated Mar. 18, 2013.
International Search Report and Written Opinion for PCT/US2012/023982 dated Mar. 11, 2013.
International Search Report, in the PCT/US2013/059456, dated Jan. 16, 2014.
International Search Report and Written Opinion for PCT/US2014/061828 dated Feb. 5, 2015.

* cited by examiner

THIN FILM ADHESIVE LABELS AND METHODS OF MAKING THEREOF

CROSS-REFERENCE TO RELATED APPLICATION

This application is a divisional of U.S. application Ser. No. 15/153,503, filed on May 12, 2016, which claims benefit of and priority to U.S. Ser. No. 62/160,190 filed on May 12, 2015, the disclosure disclosures of which are incorporated herein by reference in their entirety.

FIELD OF THE INVENTION

The invention is generally directed to thin film labels and methods of making thereof.

BACKGROUND OF THE INVENTION

Typical container decorations include the use of pressure-sensitive labels. A typical pressure-sensitive label includes a printed clear film, a pressure sensitive adhesive, and a release liner. The label (i.e., the film and indicia) typically adheres to a container with the pressure-sensitive adhesive. The release liner is discarded after labeling the containers.

An unprinted laminate construction is typically produced through a lamination process where a release liner is laminated to the unprinted clear film using a pressure sensitive adhesive.

Clear film pressure sensitive laminate constructions are popular as they provide container decorations with minimal aesthetic interruption caused by labeling media. This allows for a greater focus on the indicia and the contents of the container.

To reduce material consumption and cost of labeling, it is common to use thin films for both the liner and the label base stock. For example, typical liners are as thin as 0.96-1.2 mils; and typical labels are 1.2 mils-3.5 mils in thickness. The liner and label base are typically extruded plastics. Typically, there are additional coatings or treatments present on the label base to enhance printability as well as promote or allow adhesion of a pressure sensitive adhesive. Typically, a liner base material is coated, siliconized, or treated to allow adequate release of a pressure sensitive adhesive during label application. However, thinner films present challenges to the laminating, printing, and application process, as the thin films do not have good handling properties. In addition, extrusion processes utilized to make thin films also have diminishing handling properties and efficiencies as film thickness decreases.

Therefore there is a need for improved thin film labels and thin film labeling system, which can be more easily handled.

There is a further need for improved thin film labels and thin film labeling systems that do not rely on costly lamination processes.

There is also a need for an improved method for making thin films and thin film labeling systems.

SUMMARY OF THE INVENTION

Thin film labels, systems, and methods of making and using thereof are described. The thin film systems contain a label and a carrier film, where the label contains an overprint layer, indicia, and an adhesive layer. The carrier film may be coated or treated on one or both sides to promote adhesive layer and/or film release. The adhesive layer can be any suitable adhesive, such as a pressure sensitive adhesive, a fluid activatable adhesive, a heat activated adhesive, or a contact activated adhesive.

The films are so thin that they are difficult to handle. Therefore, they are formed by printing or coating the precursor materials on a support substrate, typically a carrier film.

The label is formed by printing or coating one or more layers of precursor material directly on the carrier film using standard printing techniques. Suitable precursor materials include, but are not limited to epoxys, solvent cast films, polyurethane dispersions, such as acrylic-urethane hybrid polymer dispersions and polyester-polyurethane dispersions. After the overprint layer dries or is cured, the indicia are printed onto the overprint layer, then the adhesive is coated or applied by a printing press on top of the indicia.

Since the label is formed using a printer, it can easily be modified to accommodate different uses.

A plurality of labels is typically formed on a single sheet or web of carrier film, which can be rolled. Each label can then be removed and the adhesive side activated if needed and placed in contact with a container. The carrier film is separated from the film label and can be reused and/or recycled when the label is placed on a container.

BRIEF DESCRIPTION OF THE DRAWINGS

In FIG. 1A, release layers are present on and abut both sides of the carrier film. In FIG. 1B a release layer is present on and abuts only one side of the carrier film.

FIG. 2A shows the label system of FIG. 1A in which the label has been dislodged from the release layers and carrier film, and attached to a container. FIG. 2B shows the label system of FIG. 1B in which the label has been dislodged from the release layer and carrier film, and attached to a container.

FIG. 4A shows a thin film label system in which the overprint and adhesive layers are formed from a single label which is rectangular in shape. FIG. 4B shows a thin film label system in which the overprint and adhesive layers are formed from a single label which is shaped to be present only where indicia are located. In FIGS. 4A and 4B, a single label contains the complete indicia. FIGS. 4C and 4D show thin film label systems formed from a group of three and seven thin film labels, respectively. Each thin film label in a group contains an overprint layer, an adhesive layer, and a portion of the complete indicia for the label system.

DETAILED DESCRIPTION OF THE INVENTION

I. Definitions

As used herein the term "thin film label system" refers to a thin film label and its carrier material, including any release liners. When in the form of a system, the carrier material is typically referred to as the "carrier film".

As used herein the term "overprint layer" refers to a layer of material in the thin film label, which covers the indicia when the label is applied to a container. The overprint layer is generally the outermost layer of a thin film label, when the label is applied to a container.

As used herein the term "pressure sensitive adhesives" refers to contact adhesives, which in their dry state at room temperature adhere to a multitude of surfaces after being lightly pressed against them.

As used herein the term "UV cured pressure sensitive coating" refers to a pressure sensitive adhesive, which upon exposure to high-intensity ultra-violet (UV) light results in an adhesive bond with high temperature stability and solvent resistance.

As used herein the term "heat activated/thermosetting adhesive" refers to a thermoplastic adhesive which is activated by heat.

As used herein the term "contact activated adhesive" refers to a pressure sensitive adhesive that requires light hand pressure to adhere to a multitude of surfaces.

As used herein the term "two-part thermoset adhesive" refers to a two-component system, which forms crosslinked polymeric resins that are cured using heat and/or heat and pressure for high strength and chemical resistance.

The terms "styrene acrylic" and "acrylic styrene" as they relate to copolymers, are used interchangeably herein to refer to copolymers having the general structure shown below:

wherein x and y are independently integers from 1 to 1000, each occurrence of R' is independently hydrogen, substituted or unsubstituted alkyl, or substituted or unsubstituted aryl, and each occurrence of R is independently hydrogen, substituted or unsubstituted alkyl, or substituted or unsubstituted aryl. The copolymer can be random, block, branched, or combinations of these. Examples of copolymers of styrene acrylic include, but are not limited to, poly(styrene-co-alkyl methacrylate), such as poly(styrene-co-methyl methacrylate), poly(styrene-co-alkyl acrylate), such as poly(styrene-co-methyl acrylate), poly(styrene-co-methacrylic acid), and poly(styrene-co-acrylic acid)).

The term "elongation to break" refers to ratio of the changed length to initial length when a sample breaks. Elongation to break can be measured using the ASTM D882 standard method.

II. Thin Film Label System

The labels described herein are thin film labels, which have thicknesses of approximately 0.1 mil to 1.5 mil, preferably the thickness of the label ranges from 0.4 to 0.6 mil. The thin film labels are typically provided in the form of a roll, where the label is attached to a carrier material. Typically the carrier material is coated on both sides with a first release layer and a second release layer, which allow for the release of the label from the carrier film, when desired.

Figure 1A:
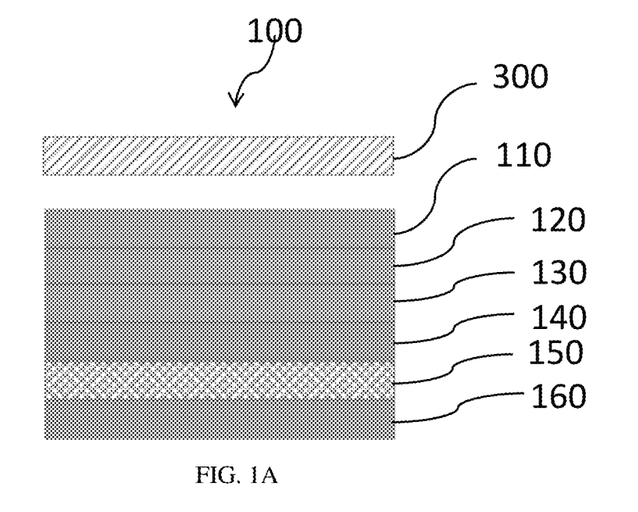
FIGS. 1A and 1B are schematics of a cross-sectional view of a label system prior to placement of the label on a container. The release layers and carrier film are attached to the label.
Figure 1B:
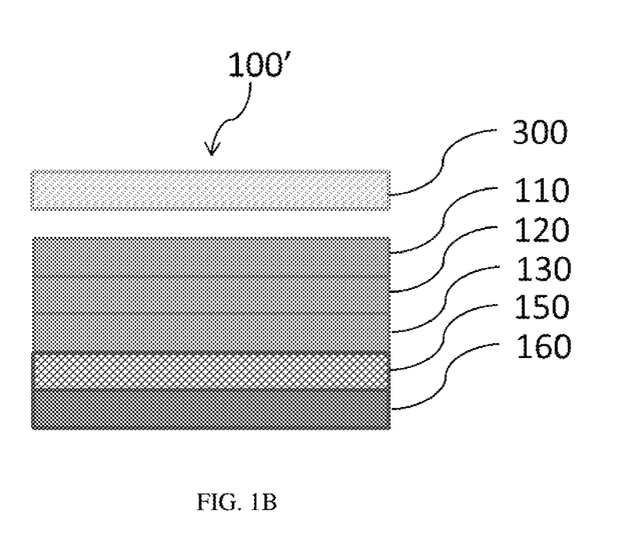

Exemplary thin film label systems, which include the carrier film, are illustrated in FIGS. 1A and 1B. As shown in FIG. 1A, the label system 100 contains an adhesive coating layer 110, an indicia layer 120, an overprint layer 130, a first release layer 160, a carrier film 150, and a second release layer 140. The label system can be applied to a container 300, and the first release layer 160, carrier film 150, and second release layer 140 can be removed. In some embodiments, the second release layer 140 is absent. For example, as shown in FIG. 1B, the label system 100' contains an adhesive coating layer 110, an indicia layer 120, an overprint layer 130, a release layer 160, and a carrier film 150. The label system can be applied to a container 300, and then the release layer 160 and carrier film 150 can be removed from the label.

Figure 2A:
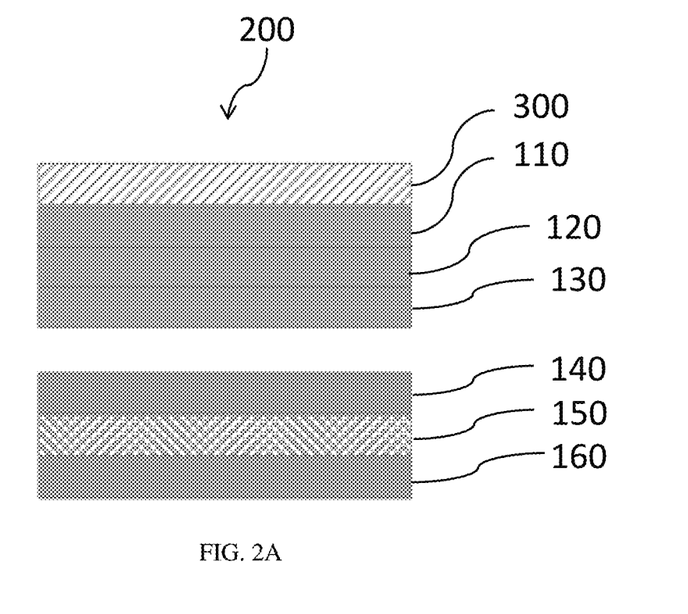
FIGS. 2A and 2B are two schematics of a cross-sectional view of a label following application of the label on a container. The release layers and carrier film are separate from the label, which is attached to the container.
Figure 2B:
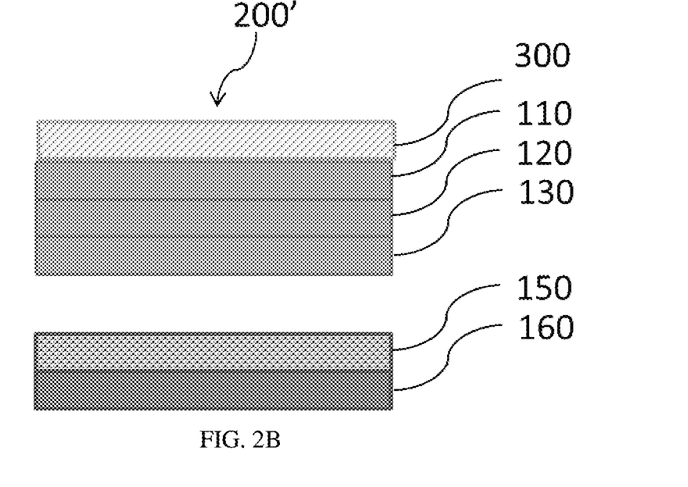

As shown in FIGS. 2A and 2B, the labels 200 and 200' that are each attached to a container 300 contains the adhesive coating layer 110, the indicia layer 120, and the overprint layer 130, where the outer surface of the container is directly in contact with the adhesive coating layer 110, and the overprint layer 130 is exposed. In FIG. 2A, the label 200 has been dislodged from the second release layer 140 and attached to a container 300. In FIG. 2B, the label 200' has been dislodged from the carrier film 150, and attached to a container 300.

1. Thin Film Label
a. Overprint Layer

Referring to FIGS. 2A and 2B, the overprint layer 130 is generally the outermost layer of the thin film label 200 or 200', when the label is attached to a container 300.

i. Coating Materials for Forming Overprint Layer

Coating materials suitable for forming the overprint layer include, but are not limited to, a solventless UV-cured system, water-based or solvent-based systems such as solution polymers or copolymers, one-part polyurethane system, two-part polyurethane system (applied at multiple print or coating stations), hot-melt polymers or copolymers and epoxy systems that can be cured applied at one or multiple print or coating stations.

Hybrid systems combining the aforementioned are also suitable. Further suitable materials include Bayhydrol® UH 240 that is commercially available from Bayer AG as an anionic polyester polyurethane dispersion, Hybridur 570® that is commercially available from Air Products and Chemicals, Inc., as an acrylic-urethane hybrid polymer dispersion, polyurethane dispersions (PUDs), polyethylene (PE) emulsions that are available as nonionic, cationic, or anionic emulsions, acrylic and/or acrylic hybrid emulsion systems, and solvent cast film polymers including, but not limited to, cellulose nitrate, cellulose diacetate, cellulose triacetate, polycarbonates, polyethersulfone, polyetherimide, polyvinylidene fluoride, polyvinyl chloride (PVC), polyimides, polyvinyl alcohol (PVA), methyl cellulose, starch derivatives, gelatin, poly(lactic-co-glycolic acid), copolymers, mixtures of polymers, and combinations thereof. In a preferred embodiment, the coating material for forming the overprint layer is Hybridur 570® or Hybridur 580®.

ii. Properties of Coating

The coating includes polymers that can be in the form of an emulsion, solution, liquid, or solventless formulation. The coating solution, liquid or emulsion can be aqueous or solvent-based. The coating may be formed from two or more precursor solutions, or from a single precursor solution.

Each of the precursor solutions can be sprayed or printed onto the carrier film and allowed to mix to form the coating.

The preferred viscosity range of the overprint coating is 0 to 1500 cps at 25° C., most preferred is 25 to 250 cps at 25° C. The preferred pH range is 6 to 10. Preferred percent solids content is 30 to 60% solids by weight.

iii. Properties of Dried/Cured Film that Forms the Overprint Layer

Referring to FIG. 1, the dried/cured film forms a continuous, thin overprint layer 130 that is capable of receiving an ink/dye/pigment formulation, possesses good tactile feel and flexibility. The overprint layer 130 can be larger than the indicia, the same size as the indicia, or formulated to be part of the indicia.

This can be accomplished by coating, printing, or casting material onto the carrier film by using a coating unit or a print station on a printing press. The overprint layer can also act as a protective barrier to the indicia to increase durability. The overprint layer also provides resistance to moisture, abrasion or scratch, corrosion by chemicals, and stains.

The overprint layer 130 typically has a low percent haze as measured by ASTM-D1003 and an excellent elongation to break. Preferably the overprint layer has a haze measurement ranging from 0% to 20%, most preferably ranging from 0% to 10%, as determined using a haze meter, such as the "haze-gloss" instrument available from BYK-Gardner.

Excellent elongation to break can be about 50% or greater, about 75% or greater, about 100% or greater, about 125% or greater, about 150% or greater, about 175% or greater, or about 200% or greater as measured by ASTM D882 standard method. Preferably the overprint layer has an elongation to break of 200% or greater.

The overprint coating preferably has good wet-out onto the release carrier substrate and has medium adhesion to the surface of the release liner. For good wet out, the surface energy of the overprint coating closely matches the surface energy of the surface to be coated. For example, when coating polyester films with a surface energy of 42 dyne/cm, the preferred surface energy range of the overprint coating is 40-45 dynes/cm. Surface energy can be measured experimentally via contact angle measurements with a goniometer and tensiometer (such as available from Ramé-Hart). Good wet out can also be visually determined. Coatings with good wet out form a consistent film free of voids, ridges, and other visual distractions. Poor wet out is characterized by inconsistent film forming, showing orange peel effects, voids, patterns, ridges, beading or other visually distracting effects.

Medium adhesion of the overprint to the release liner can be measured by the force required to separate the two layers. The "separation" force can be measured by ASTM method D-3330. The preferred force range to achieve medium adhesion is 100 to 1000 g/in. The most preferred range is 200 to 600 g/in. The adhesion forces between the adhesive layer and the surface of the container must be greater than the adhesion forces between the overprint layer and the carrier; however, the adhesion forces between the overprint layer and the carrier must be greater than the adhesion forces between the adhesive layer the backside of the carrier. This allows the system to be self-wound without causing premature blocking or delamination of the thin label, while still allowing the thin label to be transferred from the carrier to the container during the application process.

The overprint layer releases cleanly from the release liner. "Releases cleanly", as used herein, generally means that the overprint layer delaminates evenly and without defect from the liner and is free of debris and buildup as evaluated by visual inspection. Further the liner is smooth and undisturbed as evaluated by visual inspection.

In some embodiments a further coating is placed on top of the overprint layer. Suitable materials for coating the overprint layer 130 include, but are not limited to, low molecular weight PVC plasticized with Palamoll® 652 and cast from tetrahydrofuran (THF), waterbased polyurethane systems (optionally diluted with PVA or other water based systems to get better release from film), materials in the Hybridur® Series 878 (N-methyl-2-pyrrolidone (NMP)-free aliphatic urethane-acrylic hybrid polymer dispersion), 570 (an acrylic-urethane hybrid polymer dispersion), 870 (NMP-free anionically stabilized acrylic urethane hybrid polymer dispersion), 580 (an acrylic-urethane hybrid polymer dispersion), Sancure® 20041 (alphatic polyurethane dispersion), Impranil® DL 1537 (anionic aliphatic polyester-polyurethane dispersion), Carboset® 514H (acrylic colloidal dispersion polymer in ammonia water), Neocryl® A-1120 (solvent free, high solids, modified acrylic styrene copolymer dispersion), Joncryl® 544 from BASF (self-crosslinking acrylic emulsion), Dur-O-Set® E-351 (vinylacetate ethylene copolymer emulsion), and combinations thereof.

b. Indicia Layer

The indicia layer 120 is formed from an ink/dye/pigment formulation that is applied to the overprint layer 130. The ink/dye/pigment formulation includes carrier solvents and materials dissolved in the solvents. The ink/dye/pigment formulation can be applied and dried onto the overprint layer 130 or diffuse into the overprint layer 130. The ink/dye/pigment formulation can be added after the overprint layer 130 is dried/cured or while the overprint layer 130 is drying/curing.

The indicia layer can be formed with a number of techniques common to the art of offset sheet and web based printing. This includes, but is not limited to, flexographic printing, offset printing, digital printing, laser printing, inkjet printing, heat-set printing, gravure printing, and screen printing. Each technique provides a plurality of different ink/dye/pigment options that are compatible with this system and typical for to the art of label printing.

i. Materials

Suitable materials that can be dissolved in the carrier solvents include, but are not limited to, a resin, a surfactant and a colorant.

a. Solvent

Generally, the solvent can be any material that can dissolve and/or disperse the resin and other materials in the ink/dye/pigment formulation. Depending on the choice of a substrate for which an ink/dye/pigment formulation is targeted, a solvent (such as an organic solvent) can be selected based on the evaporation rate of a solvent. Certain non-aqueous inks have been disclosed in U.S. Patent Application Publication Nos. US 2005/0039634 to Hermansky, US 2009/0246377 to Robertson, et al., and US 2010/0098860 to Robertson, et al. and in published PCT applications WO 2010/042104 to Barreto, et al. and WO 2010/042105 to Barreto, the entire contents of which are incorporated herein by reference.

The evaporation rate of a solvent can typically be determined by the ASTM method D3359, and can be reported as a relative evaporation rate (RER), usually relative to n-butyl acetate. Based on this RER, the solvents can be grouped in a manner depending on the application envisioned. The solvents are categorized as a fast, intermediate and a slow solvent according to their RERs: solvents having a RER greater than 1.0 can be grouped as fast solvents; solvents having a RER from about 1.0 to about 0.01 can be grouped as intermediate solvents; and solvents having a RER less than about 0.01 can be grouped as slow solvents. The RERs can typically be correlated with the volatility of a solvent. A fast solvent typically evaporates faster and can lead to rapidly increasing viscosity of an ink. Although a solvent may be mentioned as a single chemical entity, derivatives of such solvents can include its structural isomers and other oligomers. The organic solvents described herein, may be used either in an anhydrous or wet form.

Examples of fast solvents can include methanol, ethanol, propanol, iso-propanol, acetone, methyl ethyl ketone, methyl isobutyl ketone, pentane, hexane, heptane, methyl acetate, ethyl acetate, propyl acetate, tert-butyl acetate, tert-butanol, tetrahydrofuran, and their mixtures.

Examples of intermediate solvents can include $C_{4-8}$ alcohols (e.g., butanol, pentanol, hexanol, heptanal, octanol, and the like), propylene glycol ethers (e.g., propylene glycol mono methyl ether, propylene glycol mono ethyl ether, propylene glycol n-propyl ether, propylene glycol n-butyl ether, and the like), dihydric alcohols (e.g., ethylene glycol, propylene glycol, butylene glycol, and the like), 1-methoxy-2-acetoxy propane, cyclohexanone, and their mixtures.

Examples of slow solvents can include, but are not limited to, glycol ethers having at least about 10 carbon atoms (e.g., at least about 1.1 carbon atoms, at least about 12 carbon atoms, at least about 13 carbon atoms, at least about 14 carbon atoms, or at least about 15 carbon atoms), dipropylene glycol methyl ether, dipropylene glycol methyl ether acetate, dipropylene glycol n-butyl ether, tripropylene glycol monomethyl ether, tripropylene glycol-n-butyl ether, propylene glycol phenyl ether, and their mixtures. The RERs of certain glycol ethers have been reviewed by Smith, R. L., in *Environmental Health Perspectives*, Vol. 57, pp. 1-4 (1984), the entire disclosure of which is incorporated herein by reference. Examples of commercial solvents include "Dowanol TPM tripropylene glycol methyl ether," and "Dowanol PM propylene glycol methyl ether" available from Dow Chemical (Midland. Mich.).

The approach described above, using different types of solvent, is well suited to develop conventional printing inks. Also contemplated are materials and approaches employed to develop other types of printing inks, such as toner inks for a laser printer. For example, U.S. Pat. No. 8,206,884 to Yang, et al., describes a method for preparing toner using micro-suspension particles, the entire contents of which are incorporated herein by reference.

b. Resin

The resin typically provides the ink/dye/pigment formulation with a desired viscosity, thermal stability, flexibility, and adhesion properties. Examples of resins include, but are not limited to, rosin modified phenolic resins, phenolic resins, styrene-acrylic resins, polyketone resins, derivatives thereof, or mixtures thereof. The inks optionally include other types of resins, such as polyvinyl butyral (PVB), acrylic, polyurethane, polyamide, polyvinylpyrrolidone (PVP), or vinyl resins, acacia (gum arabic); gum ghatti; guar gum; locust (carob) bean gum; karaya gum (sterculia gum); gum tragacanth; chicle; highly stabilized rosin ester; tall oil; manila copais; corn gluten; coumarone-indene resins; crown gum; damar gum; p, alpha-dimethylstyrene; gum elemi; a rosin glycerol ester; an ethylene vinyl acetate (EVA); a polyamide resin; ethylene oxide polymer and its adducts; ethylene oxide/propylene oxide copolymer and its adducts; galbanum resin; gellan gum; ghatti gum; gluten gum; gualac gum; guarana gum; heptyl paraben; cellulose resins, including methyl and hydroxypropyl; hydroxypropyl methylcellulose resins; isobutylene-isoprene copolymer; mastic gum; oat gum; opopanax gum; polyacrylamide; modified polyacrylamide resin; polylimonene; polyisobutylene (min. MW 37,000); polymaleic acid; polyoxyethylene derivatives; polypropylene glycol (MW 1200-3000); polyvinyl acetate; polyvinyl alcohol; polyvinyl polypyrrolidone; polyvinyl pyrrolidone; rosin, adduct with fumaric acid, pentaerythritol ester; rosin, gum, glycerol ester; rosin, gum or wood, pentaerythritol ester; rosin, gum or wood, partially hydrogenated, glycerol ester; rosin, gum or wood, partially hydrogenated, pentaerythritol ester; rosin, methyl ester, partially hydrogenated; rosin, partially dimerized, glycerol ester; rosin, partially hydrogenated; rosin and rosin derivatives; rosin, polymerized, glycerol ester; rosin, tall oil, glycerol ester; rosin, wood; rosin, wood, glycerol ester; purified shellac; styrene; styrene terpolymers; styrene copolymers; sucrose acetate isobutyrate; terpene resins, natural and synthetic; turpentine gum; vinylacetate; vinyl chloride-vinylidene chloride copolymer; zanthan gum; and zein.

Examples of commercial resins include the Joncryl family of resins (available from BASF), Reactol K3107 (a phenolic resin from Hexion), Resin SK (a polyketone resin from Evonik), Alnovol PN320 novolak phenolic resin from Cytec), Laropal A81 (an aliphatic aldehyde resin from BASF), and Foral 85 hydrogenated rosin ester resin, available from Hercules Chemical Company, Inc.; 111 South Street, Passaic, N.J. 07055. Preferred molecular weights for these polymers range from 150,000 daltons to 1,000,000 daltons, more preferably from 200,000 daltons to 500,000 daltons.

c. Surfactant.

Optionally, the ink/dye/pigment formulation includes one or more surfactants. The surfactant(s) can serve to alter the surface tension of the ink/dye/pigment formulation. Suitable types of surfactants include, but are not limited to, anionic (such as sulfate esters, carboxylates, sulfonates, or phosphonates), cationic, nonionic (such as polyol based, polyglycerols based, fluorocarbon based, siloxane-based, alkyl phenol based, or polyoxyethylene based) or amphoteric (such as phosphatides, imidazoline derivatives, or betaines) surfactant compounds, such as those described in "Surfactants and Interfacial Phenomena," Second Edition, M. J. Rosen, 1989, John Wiley and Sons, Inc., New York, pages 1-32, the contents of which are incorporated herein by reference.

The inclusion of a surfactant within an ink/dye/pigment formulation can lead to a barrier in the form of a layer of surfactant at the interface of air and bulk ink, thereby reducing, and preferably substantially eliminating, the ability of the solvent to evaporate from the bulk ink/dye/pigment formulation. By reducing the solvent evaporation rate, and preferably entirely preventing solvent evaporation of the ink/dye/pigment formulations, the decap time can be increased. At the same time, once an ink/dye/pigment formulation is placed onto a substrate, fast evaporation (i.e., fast drying time) can occur because the surfactant molecules can spread out over a larger surface area instead of being confined to a surface that is under tension.

Fluorosurfactants are surfactants that can either be ionic (with the fluorine-containing moiety being part of either the cationic or the anionic part) or nonionic (such as fluorocarbon chain-containing alcohols). The fluorosurfactants can be ethoxylated surfactants (i.e., polyethyleneoxide modified) or polytetrafluoroalkylene surfactants. Ethoxylated surfactants include one or more of ethylene oxide monomeric units. Polytetrafluoroalkylene surfactants include one or more of tetrafluoroalkylene units. Examples of fluorosurfactants include polyethylene oxide-b-poly(tetrafluoroethylene) polymers, 2-(perfluoroalkyl)ethyl stearate, anionic lithium carboxylate fluorosurfactant, anionic phosphate fluorosurfactant, anionic phosphate surfactant, amphoteric quaternary ammonium-acetate fluorosurfactant, fluoroaliphatic polymeric esters, their derivatives, and their mixtures. Examples of commercial fluorosurfactants include Zonyl family of fluorosurfactants (e.g., Zonyl FSO 100, Zonyl FSN, Zonyl FTS) and Capstone family of fluorosurfactants (available from DuPont Chemicals, Wilmington, Del.), or Fluorad FC 170-C, FC171, FC430 and FC431 available from 3M of St. Paul, Minn. Hermansky (see above) discloses the complete drying of the inks in the presence of Zonyl FSX surfactant.

Siloxane-based surfactants are surfactants which can be copolymers of silyl ethers and epoxy (ethylene oxide, propylene oxide) oligomers or polymers. Examples of siloxane-based surfactants include polysiloxane-b-ethylene oxide, polysiloxane-b-propylene oxide, polysiloxane-b-propylene oxide/ethylene oxide, their derivatives, and their mixtures. Examples of commercial siloxane-based surfactants include copolymers such as SILWET® copolymers including Silwet L-7604, available from GE Silicones; Troysol Q-148 and 5366 available from Troy Chemical.

Acetylenic diol-based surfactants are surfactants which can be acetylenic diols comprising hydrophobic groups at the end of the acetylenic spacer and hydrophilic and/or hydrophobic ethers hanging off of the hydroxyl groups. Examples of acetylenic diol-based surfactants include, 2,4,7,9-tetramethyl-5-decyne-4,7-diol (TMDD), 2,5,8,11-tetramethyl-6-dodecyne-5,8-diol, their derivatives, and their mixtures. Examples of commercial acetylenic dial-based surfactants include Dynol series (Dynol 604) and Surfynol series (Surfynol 104, 420, 465, 485, TG-E, SE, etc.) available from Air Products.

Hydrocarbon-based surfactants are surfactants which can be polyoxyethylenated alkyl phenols (APE type), polyoxyethylenated short chain alcohols (AE type), or long chain organic acid esters. Examples of hydrocarbon-based surfactants include polyoxyethylene (10) isooctylcyclohexyl ether, (1,1,3,3-tetramethylbutyl)phenyl-polyethylene glycol, polyethylene glycol tert-octylphenyl ether, polyoxyethylenesorbitan monopalmitate, their derivatives, and their mixtures. Examples of commercial hydrocarbon-based surfactants include Triton X Series and Tergitol Series, both from. Dow Chemical; the TWEEN Series from ICI Americas; and the Igepal Series from Hallstar.

d. Colorants

The ink/dye/pigment formulation may include a colorant, which provides color to the ink/dye/pigment formulation. The ink/dye/pigment formulation can contain a sufficient amount of a colorant that the ink/dye/pigment formulation has color, but not so much as to interfere with other desirable qualities, such as surface tension or viscosity.

An ink/dye/pigment formulation can include one or more colorants (e.g., one or more pigments, one or more dyes, or their mixtures). Colorants can provide an ink/dye/pigment formulation with, for example, a desired color and/or opacity. Exemplary colors can include black, cyan, magenta, yellow, red, blue, green, brown, or their combinations.

Examples of suitable pigments include Color Index Pigment Black 7; Pigment Blue 15; Pigment Red 112, 146, 170 and 208; Pigment Yellow 17 and 83; Pigment Green 7; carbon black, graphite; and pigment white titanium dioxide. Additional examples are disclosed in, e.g., U.S. Pat. No. 5,389,133 to Xerox Corporation, the entire contents of which are incorporated herein by reference. The pigment may also have a modifying group on its surface, such as an oxygen-containing functionality (e.g., a carboxyl or phenol group). An example of a commercially available pigmented colorant can be "Special Black 4A" available from Evonik Degussa (Germany).

Examples of dyes include Orasol Pink 5BLG, Black RLI, Blue 2GLN, Red. G, Yellow 2GLN, Blue GN, Blue BLN, Black CN, and Brown CR (all available from Ciba-Geigy, Inc., Mississauga, Ontario); Morfast Blue 100, Red 101, Red 104, Yellow 102, Black 101, and Black 108 (all available from Morton Chemical Company, Ajax, Ontario); and a mixture thereof.

e. Other Modifying Agents in the Ink/Dye/Pigment Formulations

The ink/dye/pigment formulations can contain smaller amounts of other ingredients without hindering the desired properties of the inks. Such ingredients include, but are not limited to, dispersants, anti-foaming agents, wetting agents, viscosity modifiers, and light stabilizers.

ii. Properties

The indicia layer 120 provides decoration to the substrate, information about the contents of the labeled container, or both. In some embodiments, the indicia layer in a single label provides the complete indicia, i.e. the desired decoration to the substrate, information about the contents of the labeled container, or both. In this instance, the overprint layer 130, the adhesive layer 110, or both, each form a continuous layer upon or under which the indicia layer 120 is located. Preferably, both the overprint layer 130 and the adhesive layer 110 form continuous layers. See, FIGS. 4A and 4B.

In other embodiments, the information and/or design on a group of labels when assembled together provides the complete indicia. See, e.g. FIGS. 4C and 4D. In these embodiments, each indicia layer in each of the labels in the group provides a portion of the indicia in the complete indicia. The complete indicia is located on and/or under discontinuous regions that contain an adhesive layer upon which a portion of the complete indicia is located. When assembled together on a substrate, the group of labels define regions on the substrate where a labd is located, and each label is separated from another label by a region of the substrate that does not contain a label (or an adhesive layer, or overprint layer, or both).

The addition of surfactants to the ink/dye/pigment formulation used to produce the indicia layer 120 can provide an extended decap time without compromising the drying time on a substrate. Surfactants can also alter the viscosity of the formulations and can further prevent the viscosity of the formulations from altering.

Viscosity ranges of the inks are very wide and depend on printing method. Offset printing inks typically range in viscosity from 40,000 to 100,000 cps at 25° C. Gravure and flexographic printing inks typically range in viscosity from 50 to 500 cps at 25° C.

c. Adhesive Layer

Referring to FIG. 2, the adhesive layer 110 covers the indicia layer, and forms the innermost layer of the label system when the label is in contact with a substrate, such as a container 300. The adhesive layer 110 provides sufficient adhesive force to attach the label to the desired container substrate. This includes enough force to delaminate or transfer the overprint layer and indicia layer from the release carrier to the container and maintain enough force to secure the label to the container. The type and strength of the adhesive layer determines the type of release coating or treatment on the carrier film.

Optionally, a layer can exist between the indicia layer and the adhesive layer to provide barrier properties to the indicia from the adhesive or to provide a priming effect for the adhesive.

The adhesive composition used to form the adhesive layer can be a pressure sensitive adhesive (PSA), such as a clear water-based pressure sensitive coating, UV cured pressure sensitive coating, heat activated/thermosetting adhesive, contact activated adhesive, two-part thermoset adhesive and/or fluid activated adhesive. Approaches to apply the adhesive layer to the indicia layer include, but are not limited to, utilizing a printing press or coating station on a printing press.

i. Materials

The adhesive compositions can contain a single polymer (e.g., homopolymers, copolymer, terpolymer, etc.) or a mixture of polymers, such as homopolymers, copolymers, terpolymers, etc., and combinations thereof.

a. Pressure Sensitive Adhesives

In some embodiments, the adhesive layer contains a pressure sensitive adhesive (PSA) and one or more tackifiers. These adhesives may be used to reduce the contact pressure required to bond the layers together, and/or increase the adhesion between the layers. PSAs include polymers such as polyethylenes, polysiloxanes, polyisobutylenes, polyacrylates, polyacrylamides, polyurethanes, plasticized ethylene-vinyl acetate copolymers, and tacky rubbers such as polyisobutene, polybutadiene, polystyrene-isoprene copolymers, polystyrene-butadiene, neoprene (polychloroprene), copolymers, and mixtures of polymers.

b. Fluid Activatable Adhesive Compositions

In some embodiments, the adhesive layer is a non-tacky fluid activatable adhesive. Exemplary fluid activatable adhesives and their corresponding activation agents are described in pending application, U.S. Ser. No. 14/310,913, filed Jun. 20, 2014, the disclosure of which is incorporated by reference in its entirety.

ii. Properties

The adhesive layer can be applied to glass and plastics commonly used in commercial applications including, but not limited to, polyethylene terephthalate (PETE, PET, PETG), polyethylene (PE), polystyrene (PS), low-density polyethylene (LDPE), linear low-density polyethylene (LLDPE), high density polyethylene (HDPE), polypropylene (PP), polyvinyl chloride (PVC) and polyvinyl chloride films, and TYVEK®, as well as other low energy and thermoplastic substrates. The adhesive layer can also be applied to paper, cardboard, or metal surfaces.

The adhesive layer provides good adhesion to the desired substrate. It is also optically clear. The adhesive layer is preferably formulated for caustic removability, such that the container and label can be separated in a recycling plant or bottle washer.

d. Carrier Film

The carrier film provides a base that can support the overprint layer during the printing and application processes. The starting material for the carrier film optionally has one or more release coatings already applied to its surfaces. Optionally, the carrier film is coated on its upper and/or lower surfaces with release coatings, where the release coating on the lower surface allows for easier release of the adhesive layer compared to the release of the overprint layer from the release coating on the upper side of the carrier film.

i. Materials

Suitable materials that can be used to produce the carrier film include, but are not limited to, polyethylene terephthalate (PET), polyethylene (PE), polypropylene (PP), polystyrene (PS), polyesters, polyamides, polyvinyl chloride, co-polymers such as styrene/acrylonitrile copolymers, ethylene/propylene copolymers, styrene/acrylonitrile copolymers, ethylene/butene-1, copolymers, ethylene/ethyl acrylate copolymers, ethylene/methyl methacrylate copolymers, ethylene/vinyl acetate copolymers.

ii. Properties

The carrier film is preferably flexible, low cost and strong. Carrier films are available with a variety of coatings/treatment to allow for the proper release of the adhesive layer when the label construction is wound or rolled such that the adhesive layer is in contact with the carrier film.

iii. Release Coatings on One or Both Sides of the Carrier Film

Referring to FIG. 1A, a first release layer 160 and a second release layer 140 are applied to opposite sides of the carrier film 150. The overprint layer 130 is in contact with a second release layer 140. If the adhesive is a PSA, the first release layer 160 prevents the adhesive coating layer 110 from strongly adhering to the carrier film 150 when the label construction is wound or rolled such that the adhesive layer is in contact with the carrier film.

Referring to FIG. 1B, a second release layer 140 is not applied to the carrier film 150 (i.e. only one release layer is present). In this embodiment, the surface of the carrier film has inherent release properties. Optionally the material that forms the carrier film 150 is PET, PP, or PS.

Referring to FIG. 2A, after the label system is applied to a container 300 via the adhesive coating layer 110, the second release layer 140 facilitates the detachment of the carrier film 150 from the label 200. In FIG. 2B, the second release layer 140 is not present. The overprint layer 130 becomes the outermost layer of the label 200. The first release layer and second release layer may not, and often do not, have the same levels of release. In some embodiments, the first release layer and second release layer are formed from the same materials, but with different percent compositions or viscosities. In other embodiments, the first release layer and second release layer are formed from different materials.

e. Release Layers i. Materials

Suitable materials that can be used to produce the release layers include, but are not limited to, silicone, high density polyethylene (PE), medium density PE, low density PE, polypropylene (PP), polytetrafluoroethylene (PTFE), acrylated silicone, polyesters, PET, polyethylene naphthylene, polyamides, co-polymers and mixtures thereof.

ii. Properties of Release Coatings a. First Release Layer

Referring to FIG. 2A, the first release layer 160 can be formulated to resist blocking with the adhesive layer 110 when the label system is wound, rolled or stacked, resist moisture, or both, i.e., resist blocking and moisture.

b. Second Release Layer

Referring to FIG. 2A, the second release layer 140 can be formulated such that there is no hazing on the overprint layer 130 after the label 200 is transferred to a substrate, such as a container 300. In some embodiments, in which the surface of the carrier film has inherent release properties, the second release layer 140 is absent (see, e.g. FIG. 2B).

III. Methods of Making Thin Film Labels with Indicia

The starting materials for forming the thin film labels described herein are a carrier film with or without release characteristics already applied to it. The label is built from a coating that becomes the overprint layer using standard coating and/or printing presses and techniques. This allows for a very small amount of material (relative to an extruded film) to be utilized. As this material is coated or printed directly onto the carrier film, its low caliper does not create the handling challenges typically associated with thin film extrusion and lamination.

The method for forming the thin film labels uses standard printers to build a label using coatings and inks typical to the industry, bypassing expensive lamination processes.

Figure 3:
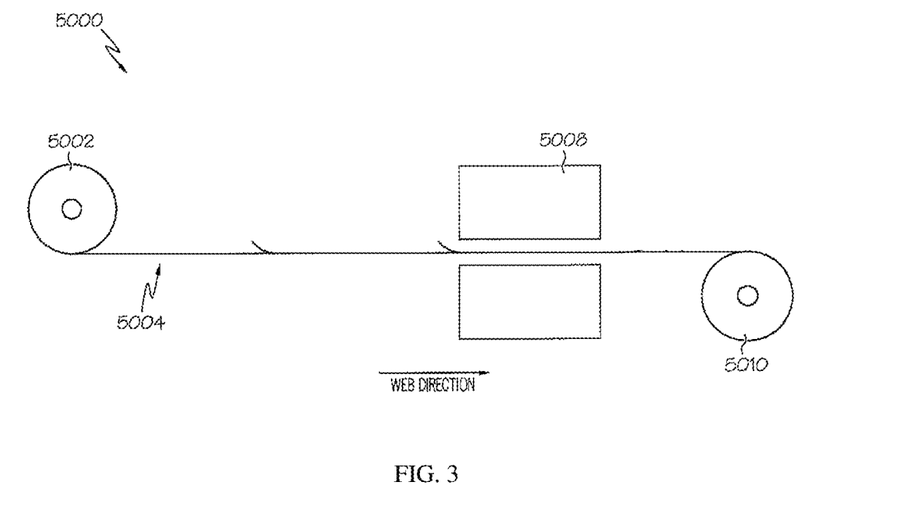
FIG. 3 illustrates a schematic view of an exemplary manufacturing process utilizing a generally continuous web.

An exemplary manufacturing process for forming the thin film labels with indicia is depicted in FIG. 3.

A schematic view of an example manufacturing process 5000 of the various steps associated with forming the thin film labels described herein is illustrated utilizing a generally continuous web 5004. A carrier film 150 can be provided as a generally continuous web that can be processed through a "reel-to-reel" style manufacturing process.

For example, the carrier film can be provided as a generally continuous web 5004 from a source station 5002, which can be a source roll or the like. Some or all of the various processing steps, such as, for example, the steps of coating a material onto the carrier film to form the overprint layer, can then be performed by passing the generally continuous web 5004 through a printing station 5008. Though only a single printing station 5008 is illustrated. However, it is to be understood that multiple printing stations can be utilized. In addition or alternatively, though not illustrated, the process 5000 can be adapted to pass the web 5004 through the printing station 5008 in multiple passes. For example, the indicia can be print on top of the overprint layer by passing the web through the printing station one or more times. Finally, the completed plurality of label systems on the generally continuous web 5004 can be collected at a take-up station 5010, which can include a collection roll to form a rolled label system, as well as finishing equipment, including die-cutting and matrix stripping equipment.

The manufacturing process 5000 can include various other stages, steps, etc. For example, pre-processing and/or post-processing stations, steps, etc. can also be included. It is to be understood that the additional equipment may be provided (e.g., idler rollers, tension rollers, turn-bars, slit or perforators, etc.) to facilitate the "reel-to-reel" process.

1. Coat or Print Coating Material onto Carrier Film

Any suitable printing technique and system can be used to coat or print the carrier film with the material for forming the overprint layer. Examples of suitable techniques include web coating technique, including, but not limited to gravure, reverse gravure, slot die, rod, knife-over-roll, flexographic, or offset coating.

For example, a typical flexographic or gravure printing press may be used to coat a carrier film with one or more layers of press printable/coatable coatings.

The carrier film is coated, flood printed, or spot printed with a sufficient amount of a polymeric material to form an overprint layer. This is preferably accomplished at a single print or coating station, but can take place across one or more stations. Alternatively, the overprint layer may be prepared prior to the printing process in a wide-web or larger format construction. Coating or printing the layer directly on the carrier allows for the label to be built on the carrier web on the coating or printing equipment. This allows for flexibility in choosing the thin label material and a reduction in complexity of the supply chain of label material. It also provides for a reduction in the amount of material required.

Typical thin film labels that are made using prior art methods may be as thin as 1.2 to 3.5 mils. In contrast, the films described herein are thinner, with typical label thicknesses ranging from 0.1 to 1.5 mils.

i. Printing

The thin film labels can also be produced using consumer or commercial laser printing techniques. Laser print engines are able to deposit indicia and coating in registration onto carrier film webs or sheets using an electrostatic digital printing process.

Laser printing produces high resolution text, graphics, and coatings by repeatedly passing a laser beam back and forth over a negatively charged cylinder or drum to define a differentially-charged indicia or transfer region on the drum. The drum then selectively collects electrically charged powdered resin and pigment formulations (toner), and transfers the toner to the web or sheet. The toner and sheet then typically pass over a fuser that heats the toner allowing it to melt and form a continuous or semi-continuous polymeric film, typically containing pigments or dyes.

Toner can generally be described as mono-component magnetic, mono-component non-magnetic, or dual component. Despite these different categories, which are based upon the type of development process used in the laser print engine, all powder toners contain a polymeric resin. Most also contain a colorant and a series of additives having a variety functions.

The polymeric resin is the ingredient of the toner that represents the major proportion of any toner composition. Depending on the type of toner composition, the composition of the polymer ranges between 40 and 95% by weight of the toner composition. Typically, the function of the polymer is to act as a binder to carry and hold the colorant on the final printed sheet or web. In this example, the toner from a specific print station or drum can act as a traditional binder or can also act as the overprint layer. When acting as an overprint layer, the polymers are deposited onto the web or sheet, and fused, followed by the deposition of additional layers on top of the overprint layer to form the thin film label. The label is initially adhered to the web or sheet, but will eventually be delaminated when the label is transferred from the carrier web or film onto a desired container or substrate.

Toner formulations that can be used to produce the thin film labels contain amorphous polymers that have a glass transition temperature (Tg) from about 20° C. to about 80° C., or from about 40° C. to about 70° C., preferably from about 50° C. to about 70° C.

Exemplary polymers that act as both a binder and an overprint layer include: resins formed from copolymers of styrene acrylic, poly(styrene-co-butadiene), polyester resins, HDPE, LDPE, and PP.

In addition to polymers, a toner formulation for a thin film label also contains a charge control agent that enables the charge characteristics of the toner to be fine-tuned, a flow control additive (for example fumed silica) to prevent the toner from caking, and a wax to prevent the toner from sticking to the heated fuser rollers.

Polyesters have the advantages of giving the toner a lower minimum fix temperature, while maintaining a higher Tg. Styrene/acrylic copolymers, such as those described above, have the advantage of possessing a lower humidity sensitivity, which translates into a more robust performance in a variety of environmental conditions. As this layer, is the outermost layer once the label is transferred or applied to a container, humidity resistance for wet environments can be important in order to protect print fidelity.

Printing coating material onto carrier film also facilitates the design of thin film label systems that have any desired shape including, but not limited to, oval, square, rectangular, etc. Further, the thin film labels are also designed such that the overprint and adhesive layers are present only in area where indicia is located. "Adhesive coating layer" and "adhesive layer" are used interchangeably to refer to the layer of the thin film labels, which contains the adhesive materials.

a. Label Formed from a Plurality of Labels

Designing the overprint layer 130 and adhesive layer 110 to closely mimic or outline the indicia layer 120 also provides an aesthetic that is typically not able to be accomplished through the use of currently available pressure sensitive labels. This aesthetic provides a no-label-look more typical of direct screen printing on containers without the material waste associated with die-cutting and matrix stripping pressure sensitive label material.

In these embodiments, the outline of the adhesive layer 110, the overprint layer 130, or both, may be discontinuous around portions of a complete indicia. In these embodiments the layouts, also called outlines, of the adhesive layer 110 and overprint layer 130 mimic each other, although this is not always required. A large overprint layer layout is also used to demonstrate the tactile properties achievable through this label construction.

In some embodiments, a carrier film contains a group of two or more labels that when assembled together define a complete indicia. In these embodiments, each label in the group is separated from the other labels in the group. Thus, the outline of one label (and its adhesive layer, optionally its overprint layer, if one is present) in the group is discontinuous with the outline of each of the other labels (and their corresponding adhesive layers, optional overprint layers, if present), creating a plurality of thin film labels that are supported on the carrier film to maintain spacing and registration. During application to a substrate, such as the surface of a container, this spacing and registration is typically maintained. The ability to fabricate and apply a plurality of labels in registration also provides a unique aesthetic not achievable with conventional pressure sensitive laminate labels.

Figure 4A:
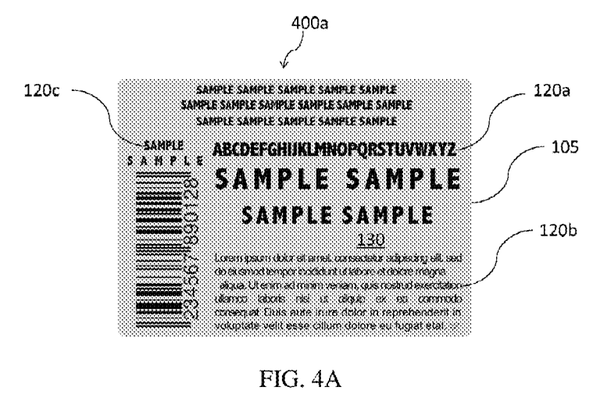
FIGS. 4A-4D show four thin film label systems with the same complete indicia, but different areas for the overprint and adhesive layers. The gray areas represent the overprint and adhesive layers, while the black areas represent the indicia.

These embodiments are further described by referring to FIGS. 4A-4D. In general, FIG. 4A, contains the indicia layer in a single label that has a single continuous outline of the overprint layer 130 and adhesive layer 110, which provides a complete indicia, i.e., the desired decoration to the substrate, information about the contents of the labeled container, or both are contained in a single continuous outline of overprint and adhesive layers. As shown in FIG. 4A, the thin film label system 400a contains print indicia 120a, 120b, and 120c, and an overprint layer 130. The shape 105 of the thin film label is rectangular.

Figure 4B:
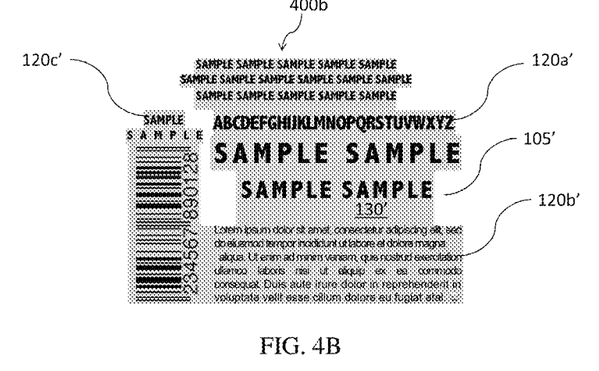

FIG. 4B shows another thin film label system, 400b that contains print indicia 120a', 120b', and 120c'. The overprint layer 130 and adhesive layer are present only where indicia are located. In FIG. 4B, the same complete indicia as shown in FIG. 4A is present, and is contained in a single label that has a single continuous outline. However, the regions containing the overprint and adhesive layers are more closely associated with regions containing the indicia compared to FIG. 4A, such that less surface area contains the overprint and adhesive layers compared to the surface area of the overprint and adhesive layers in the label of FIG. 4A.

Figure 4C:
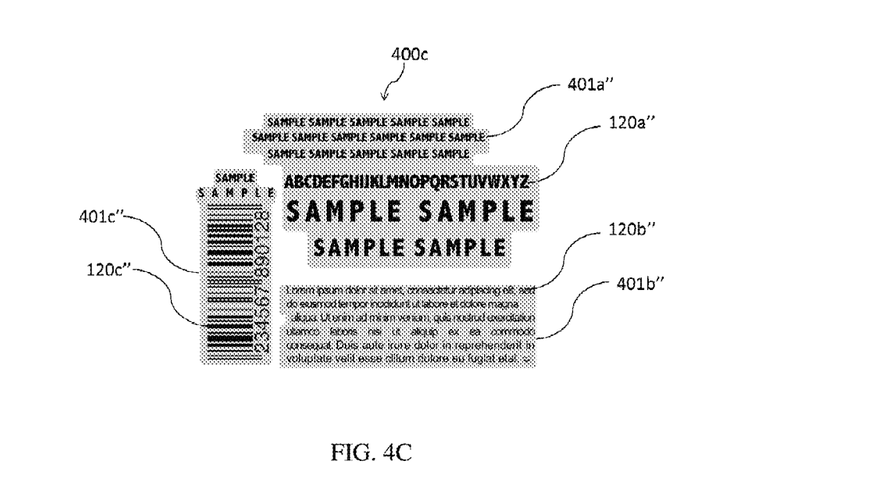
Figure 4D:
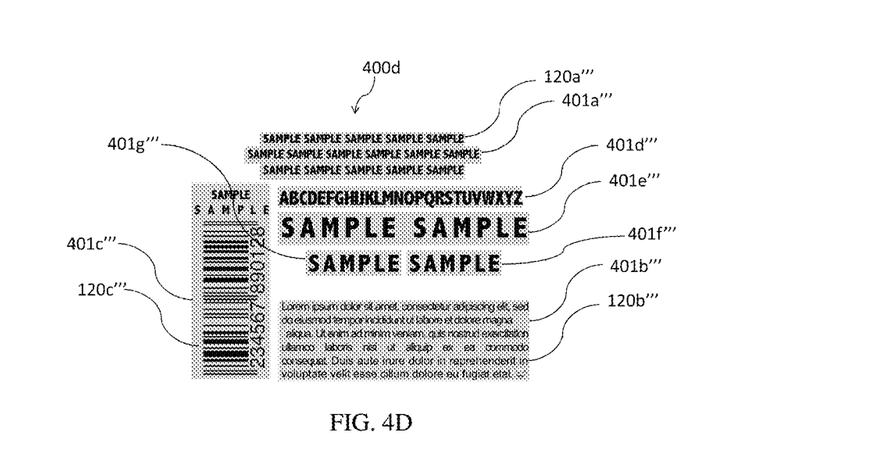

In FIGS. 4C and 4D, the indicia on the label shown in FIG. 4A are partitioned into three and seven separate labels, respectively, each containing a portion of the indicia shown in the label of FIG. 4A. For example, when the three labels shown in FIG. 4C are combined, they form group of labels that has discontinuous outlines of the individual labels in the group (and discontinuous outlines of their corresponding adhesive and overprint layers), but includes the complete indicia, as shown in FIG. 4A.

FIG. 4C shows a thin film label system 400c formed from a group of labels containing three thin film labels, 401a", 401b", and 401c", each containing a portion of indicia 120a", 120b", and 120c", respectively, of the complete indicia. The portions of indicia collectively form the complete indicia (as shown in FIGS. 4A and 4B).

FIG. 4D shows a thin film label system 400d formed from a plurality of seven thin film labels 401a''', 401b''', 401c''', 401d''', 401e''', 401f''', and 401g''', each containing a portion of indicia. Portions of indicia 120a''', 120b''', and 120c''' are identified for thin film labels 401a''', 401b''', and 401c'''. The portions of indicia for all seven thin film labels collectively form the complete indicia.

These designs of thin label systems are obtained using flexographic printing and coating. As is typical with flexographic printing and coating, the flexograhic inking system contains an ink/coating fountain or pan, in which the ink or coating is stored. A fountain roller rotated in the pan, picking up a film of ink/coating on its rubber-covered surface. The fountain roller acts to effectively deliver ink/coating to the surface of the adjacent anilox roller. The anilox rollers are chrome-plated or ceramic-covered rollers containing pyramid-shaped cells embedded in its surface. Other shapes that can be used include, but are not limited to hexagonal-patterns or diamond-shapes. The function of the anilox roller is to deliver a predetermined amount of ink/coating to the adjacent flexographic printing plate. The inks utilized are typical inks utilized for water-based flexographic printing. Examples include, but are not limited to, SolarAqua, Solar-Clear, SolarFlex, SolarScreen, and/or SunBeam (all manufactured by SunChemical).

2. Dry or Cure Coating Material to Form Overprint Layer

After the polymeric material is coated or printed onto the carrier film, it is dried or allowed to dry or cure. In some embodiments, the coating may be air-dried, IR oven dried, forced air oven dried, or cured using UV, electron beam, or other energy source to form the overprint layer. Typical periods for drying the polymeric material to form the overprint layer include open air drying, convection air drying, IR oven drying, and UV oven drying and curing. Generally, the press or coater speed and the oven length will dictate the amount of time the coating is allowed in the oven. In aqueous and solvent-based systems, preferably the coating is able to dry to below 5% (by weight) moisture while in the oven. For a typical flexographic printing press, speeds of greater than 1,200 feet per minute are obtainable with the use of forced air ovens typical to the industry.

3. Apply Inks to Exposed Surface of Overprint Layer to Form Indicia Layer

The ink/dye/pigment formulation(s) are typically applied using reverse transfer printing processes. In this process, the printer releases one or more ink/dye/pigment formulations onto the exposed surface of the overprint layer. The image that is printed on the surface is oriented as the mirror-image of the indicia that will be viewable when the label is placed on the container.

Different ink/dye/pigment formulations can be applied simultaneously or sequentially to obtain indicia with the desired appearance.

4. Apply Adhesive Layer to Exposed Surface of Indicia Layer and Exposed Surface of Overprint Layer, if any After the indicia are printed on the overprint layer, a suitable adhesive composition is coated or spot printed on top of the indicia, and any exposed portion of the overprint layer.

5. Form Roll of Labels

Once the formation of the label is complete, the label system is cut to the desired size, scored, if necessary, optionally separation portions are located between the individual labels in a set of printed labels. Finally, the set of labels is rolled to form a roll of labels.

IV. Methods of Using Thin Film Labels with Indicia

In use, a roll of a plurality of labels may be provided. High speed labeling systems can be used to remove one label at a time and adhere the adhesive layer to the desired surface of a container. Alternatively, the thin label can be transferred directly from the carrier film to the container by running the carrier film and thin label into direct contact with the surface of the container.

The carrier film can also be used to drive the label through a series of rollers to ensure uniform tension as the thin label system is contacted with the container.

As the adhesive layer adheres the label to the container, the overprint layer separates from the release layer that is attached to the carrier film, allowing the label to attach to the container.

Each successive label is removed, as described above, leaving a long roll of carrier film, which can be rewound and reused to form another roll of labels or optionally, recycled or otherwise disposed of.

When the label is placed on a container, the indicia layer is trapped between the surface of the container and the overprint layer, which protects the printed material.

In some cases the carrier film can be cut using the label application equipment or supplied in a precut form and also applied to the container.

The carrier film can optionally also carry indicia. This provides a system where the container is permanently labeled with a thin-film clear label and semi-permanently labeled with a removable carrier film.

The present invention will be further understood by reference to the following non-limiting example.

EXAMPLE

Example 1. Thin Film Label Via a Coating Technique

A thin film label was constructed with an untreated PET carrier sheet having a thickness of 3.0 mils (SG00-300 by SKC Films). The overprint layer, containing a blend of 95% Hybridur 580 and 5% polyethylene wax dispersion, was coated onto the carrier film using a Mayer rod technique with an approximate dry coat weight of 4 grams/square meter. The overprint layer was dried in a forced air oven. Indicia were applied to the overprint layer using an electrostatic digital transfer printing (laser printing) technique. An adhesive layer containing Encor 123 was then applied to the web at a coverage of 5 dry grams/square meter using a Mayer rod technique. The adhesive layer was dried in a forced air oven.

The resulting label had a low percent haze, i.e. excellent clarity.

The thickness of the overprint, indicia, and adhesive layer was 0.5 mils.

Example 2. Thin Film Label Via Printing Press Techniques

In another example, the thin film label was prepared utilizing an eight station flexographic printing press (Table 1). Referring to FIG. 2B, in this example, the carrier sheet 150 was a one-side-coated PET release liner (Silphan S50 produced by Siliconature) where the side of the PET release liner being printed upon was untreated. The side of the carrier sheet opposite to that having the PET release liner was coated with a silicone coating 160 to enhance release. The press was configured to allow for one to two press stations to be utilized for the printing of the overprint coating layer 130; another one to four press stations to be utilized for the printing of the indicia 120 (Flexographic colors 1-4), and another one to two stations to be utilized for the printing of a pressure sensitive adhesive 110.

TABLE 1

Press stations from an eight station flexographic printing press, used to prepare thin film labels

| Press Station | Anilox Roller | Coating/Ink |
|---|---|---|
| 1 | 440 | Overprint Coating |
| 2 | 440 | Overprint Coating |
| 3 | 600 | Flexographic Color 1 |
| 4 | 800 | Flexographic Color 2 |
| 5 | 800 | Flexographic Color 3 |
| 6 | 800 | Flexographic Color 4 |
| 7 | 440 | Pressure Sensitive Adhesive |
| 8 | 160 | Pressure Sensitive Adhesive |

The anilox rollers were chrome-plated or ceramic-covered rollers containing pyramid-shaped cells embedded in its surface. The flexographic printing plates were set using a computer-to-plate photopolymer system. The imprinting of the flexographic printing plate dictates where coating and/or ink will be applied on the transfer carrier at the first printing stations and on top of previous prints/coats on all following printing stations. In one example, FIG. 4D, this allowed for the overprint layer 130 to only be applied in areas where indicia 120 is applied. This greatly minimized the area and volume of material needed to fabricate a label.

The overprint layer 130 contained between 80% to 100% Bayhydrol® UH 240, 0% to 20% ethanol (to control foam and coating cosmetics), and 0% to 1% of Blankophor P150 (Indulor America, Graham, N.C.)—a stilbene fluorescent whitening agent. Blankophor P150 is a black light sensitive dye that provides visual registration of layers under black light without compromising the optical clarity/haze of the dried coating). The dried layer possessed excellent clarity, elongation to break, and ultimate tensile strength. The inks utilized were typical inks utilized for water-based flexographic printing.

The adhesive used was a formulation containing between 95% and 100% Arkema 9466 (from Arkema) and between 0% and 1% Blankophor P150. Arkema 9466 is formed from an acrylic polymeric dispersion. The dried adhesive formulation possessed excellent optical clarity.

The indicia 120 utilized at the stations containing flexographic ink contained multiple lines of a text, an image, and a standard barcode.

The adhesive layer 110 and the overprint layer 130 were optically clear and as such they did not provide any ascetic value or distraction from the containers being labeled. Different layouts of the overprint and adhesive layers to maximize material use efficiency were demonstrated without impacting the aesthetic value provided by the indicia 120 (see FIGS. 4A-4D).

The press was run at web speed of 250 feet per minute with forced air ovens active after each flexographic station. An electronic vision and registration system was utilized to register the indicia and coating at each print station allowing for the coatings and indicia at each station to be placed on top of the material coated or printed at the previous station. Multiple rows or lanes of labels were fabricated across the width of the web. The carrier film was self-wound at the rewind station of the press such that the siliconized side was in contact with the pressure sensitive adhesive upon winding.

The carrier film 150 was successfully slit to the width of a single label and rewound without delamination of the thin label from the uncoated side of the PET.

The carrier film web was threaded in a custom fixture that allows the adhesive side of a single label to come into contact with a single container. The thin labels were successfully transferred from the carrier film to the container 300 (FIG. 2). Twelve containers were tested, with four in each group. The tested containers 300 included glass, PET, and PP style bottles.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

We claim:

1. A label system comprising a thin film label and a carrier film,
    wherein the label comprises an overprint layer, an indicia layer, and an adhesive layer, wherein the indicia layer is located between the overprint layer and the adhesive layer, wherein the label has a thickness ranging from 0.1 mil to 1.5 mil,
    wherein the adhesive layer comprises a pressure sensitive adhesive, and wherein the carrier film comprises a first release layer on a first side and a second release layer on a second side,
    wherein the second release layer is in contact with the overprint layer,
    wherein the first release layer is in contact with the pressure sensitive adhesive, and
    wherein the first release layer separates more easily from the pressure sensitive adhesive than the second release layer separates from the overprint layer.

2. The system of claim 1, wherein when the system is in the rolled configuration, the overprint layer is adjacent to the second release layer.

3. The system of claim 1, wherein the overprint layer has a haze measurement ranging from 0% to 20% as determined using a haze meter as measured by ASTM-D1003, and an elongation to break of 50% or greater as measured by ASTM D882.

4. The system of claim 1, wherein the overprint layer comprises a polyurethane.

5. The system of claim 4, wherein the polyurethane is an acrylic-urethane polymer or a polyester-polyurethane polymer.

6. A group of thin film labels comprising a plurality of thin film labels on a carrier film, wherein each thin film label comprises an overprint layer, an indicia layer, and an adhesive layer, wherein the indicia layer is located between the overprint layer and the adhesive layer, and wherein each of the labels has a thickness ranging from 0.1 mil to 1.5 mil, wherein each label is discontinuous with the other labels in the group,
    wherein the adhesive layer comprises a pressure sensitive adhesive, and wherein the carrier film comprises a first release layer on a first side and a second release layer on a second side,
    wherein the second release layer is in contact with the overprint layer,
    wherein the first release layer is in contact with the pressure sensitive adhesive, and
    wherein the first release layer separates more easily from the pressure sensitive adhesive than the second release layer separates from the overprint layer.

7. The group of claim 6, wherein the indicia layer in each of the thin film labels contains a portion of a complete indicia.

8. The group of claim 6, wherein when the thin film labels in the plurality of thin film labels are combined, they form a complete indicia.

9. The group of claim 6, wherein the overprint layer comprises a polyurethane.

10. The group of claim 9, wherein the polyurethane is an acrylic-urethane polymer or a polyester-polyurethane polymer.

11. The group of claim 6, wherein the overprint layer and adhesive layer are present only where the indicia layer is located.

* * * * *